United States Patent

Nishimura

[11] Patent Number: 6,130,515
[45] Date of Patent: Oct. 10, 2000

[54] POSITIONING CONTROL UNIT

[75] Inventor: Makoto Nishimura, Nagoya, Japan

[73] Assignee: Mitsubishi Denki Kabushiki Kaisha, Tokyo, Japan

[21] Appl. No.: 09/196,176

[22] Filed: Nov. 20, 1998

[30] Foreign Application Priority Data

Oct. 1, 1998 [JP] Japan .................................. 10-280113

[51] Int. Cl.[7] .................................................. G05B 19/18
[52] U.S. Cl. ......................... 318/567; 318/568.1; 318/569
[58] Field of Search ........................... 318/567, 600–603, 318/568.1, 568.22, 568.23, 569; 364/167.01, 136, 140

[56] References Cited

FOREIGN PATENT DOCUMENTS 9-258808  10/1997  Japan .
9-269806  10/1997  Japan .

Primary Examiner—David Martin
Assistant Examiner—Rita Leykin
Attorney, Agent, or Firm—Sughrue, Mion, Zinn, Macpeak & Seas, PLLC

[57] ABSTRACT

A positioning control unit in which a motion control unit receives a start signal for a motion program outputted from a sequence control section and transmits a drive signal to a servo amplifier according to the operational contents indicated in the motion program. The servo amplifier transmits a control signal to a servo motor according to the drive signal and provides controls over the servo motor. The motion control section stores a start signal in an interface section when it receives a start signal for a motion program to be executed next from the sequence control section during operation of the motion program, and executes the motion program indicated by the start signal after the operation of the motion program in operation is completed.

15 Claims, 18 Drawing Sheets

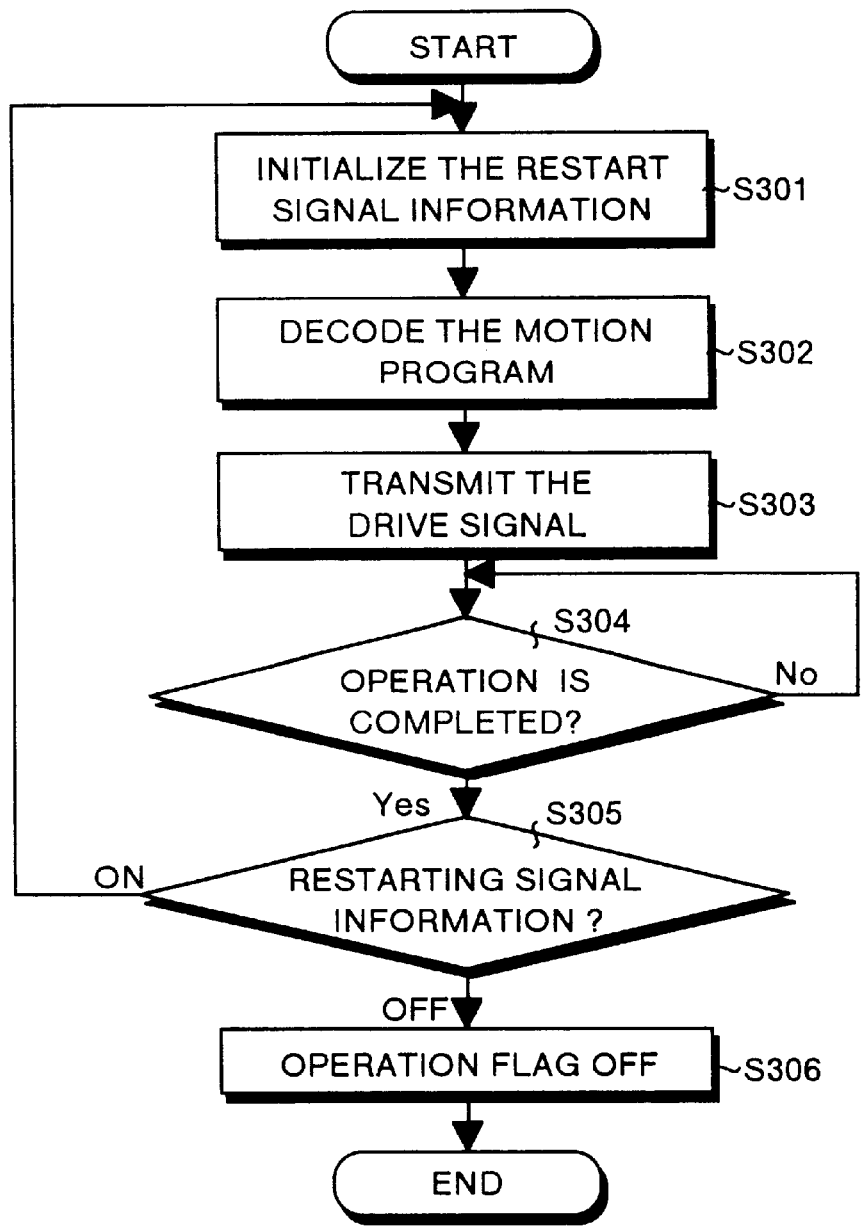

FIG.12

| | | |
|---|---|---|
| INC-1 | | |
| SHAFT1, | 1 0 0 0. | mm |
| SPEED | 1 0 0. | mm/rev |
| V1 | 2 0 0 0 | PPS |
| E1 | 2 0 0 0 | PLS |
| V2 | 3 0 0 | PPS |
| E2 | 6 0 0 0 | PLS |

FIG.14

| V1 |
| --- |
| E1 |
| V2 |
| E2 |
| V |
| ΔP |
| DISPLACEMENT COUNT VALUE |
| DETERMINATION COUNT VALUE |
| THIS TIME VALUE |
| PREVIOUS TIME VALUE |
| NUMBER OF PULSES PER REV OF MOTOR |

G01X100. F1000. ;

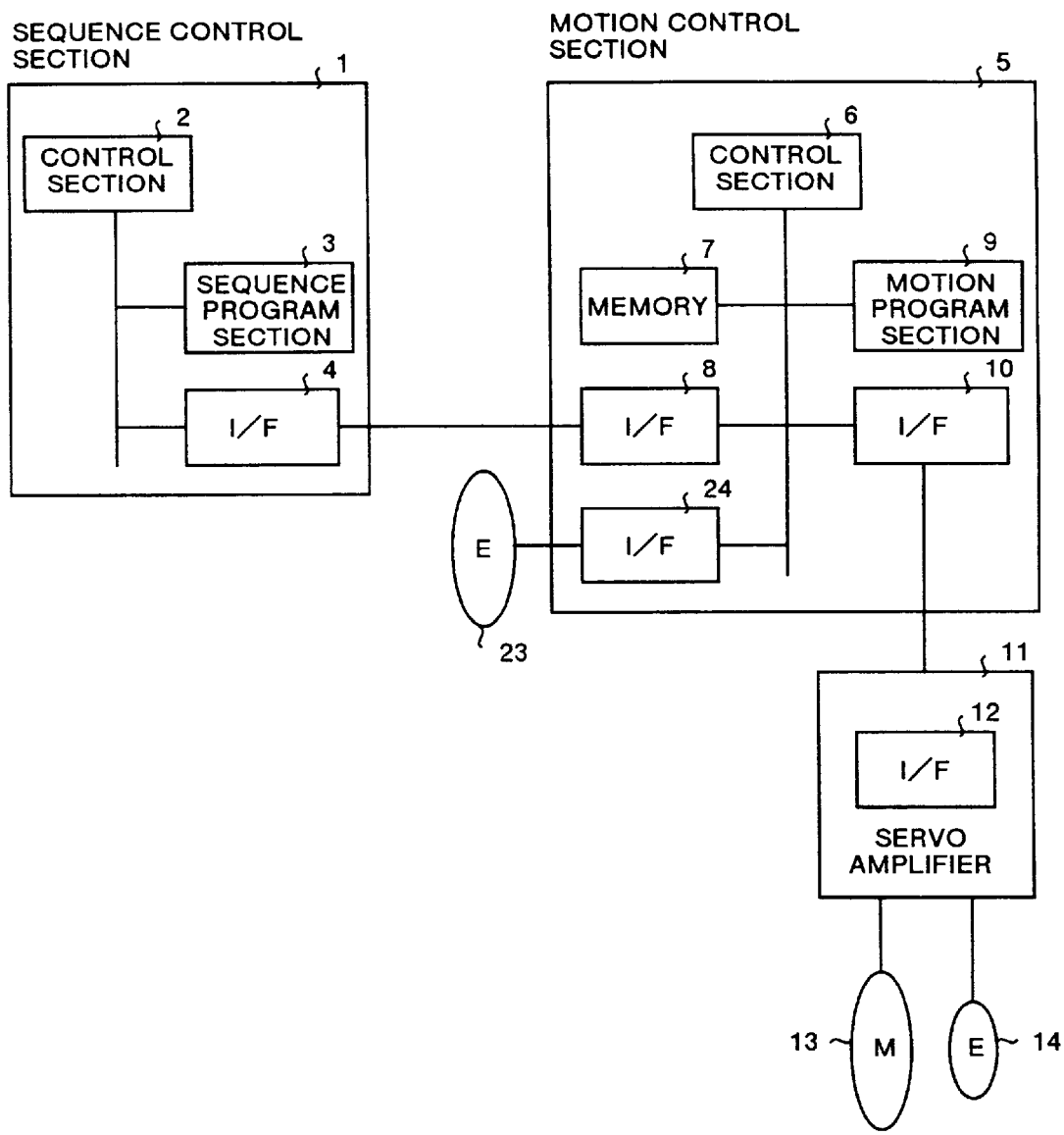

FIG.23

| ΔP |
|---|
| CURRENT VALUE |
| PREVIOUS VALUE |
| NUMBER OF PULSES PER REV OF MOTOR |

POSITIONING CONTROL UNIT

FIELD OF THE INVENTION

The present invention relates to a positioning control unit for positioning a servo motor at a target position.

BACKGROUND OF THE INVENTION

FIG. 15 is a block diagram showing one example of a conventional type of positioning control unit. In FIG. 15, the conventional type of positioning control unit comprises a servo motor 13 as the equipment to be controlled, an encoder 14 for detecting a position and a speed of the servo motor 13, a servo amplifier 11 for driving the servo motor 13, a motion control section 5 for transmitting a drive signal for driving the servo motor 13 to the servo amplifier 11, and a sequence control section 1 for transmitting a control signal to the motion control section 5 according to a preset sequence program.

The sequence control section 1 comprises a sequence program section 3 for storing therein a sequence program shown in FIG. 16, a control section 2 for generating a start signal or the like according to the sequence program stored in the sequence program section 3, and an interface section 4 for transmitting the start signal or the like generated in the control section 2 to the motion control section 5. The sequence program in FIG. 16 is an example of the program set by a user using a peripheral equipment such as a keyboard or the like.

The motion control section 5 comprises an interface section 8 for receiving the start signal or the like transmitted from the sequence control section 1 (precisely, the interface section 4), a motion program section 9 for storing therein a motion program as shown in FIG. 17 (indicated as G code which is generally used in a machine tool when a servo motor is driven), a control section 6 for generating a drive signal according to the start signal received in the interface section 8 as well as according to the motion program stored in the motion program section 9, and an interface section 10 for transmitting the drive signal generated in the control section 6 to the servo amplifier 11. The motion program in FIG. 17 is an example of the program set by a user using a peripheral equipment such as a keyboard or the like.

The servo amplifier 11 has an interface section 12 for receiving the drive signal transmitted from the motion control section 5 (precisely, the interface section 10), and drives the servo motor 13 according to the drive signal received in the interface section 12 as well as according to the position signal and speed signal detected in the encoder 14.

Operation of this conventional type of positioning control unit is described below. In the sequence control section 1, the control section 2 reads out the sequence program shown in FIG. 16 from the sequence program section 3. The control section 2 determines whether an operating condition in the sequence program holds or not. When it is determined that the operating condition holds, the control section 2 generates a program-number signal indicating a number of the motion program ("No. 1" herein) to be executed as well as generates a start signal, and transmits these signals to the interface section 4. The interface section 4 receives the program-number signal and the start signal transmitted from the control section 2 and transmits these signals to the motion control section 5 (precisely, the interface section 8).

Operation in the motion control section 5 is described below with reference to the flow charts in FIG. 18 and FIG. 19. As shown, in FIG. 18, the control section 6 in the motion control section 5 determines whether the interface section 8 has received a start signal or not. Especially in the interface section 8, a start flag indicating an ON/OFF state of the start signal is prepared, and when the start signal is received, this start flag is changed to an ON state. The control section 6 determines whether this start flag is in an ON state or not (step S1001). When it is determined in step S1001 that the start flag is not in the ON state, the processing in the flow chart in FIG. 18 is ended.

If it is determined in step S1001 that the start flag is in an ON state, it is determined whether an operation flag indicating an operating state of processing to be executed (in this case, processing according to an instruction of the previous sequence program) in the motion control section 5 is in an ON state or not (step S1002). When it is determined in step S1002 that the operation flag is not in an ON state, namely when the operation flag is in an OFF state, the motion control section 5 reads in a pro gram number indicated by a program-number signal received in the interface section 8, and selects the motion program indicating the program number (step S1003) With this operation, the start flag is changed to an OFF state and the operation flag is changed to an ON state (step S1004). The motion control section 5 executes the processing (describe later) according to the motion program selected in step S1003 (step S1005), and ends the processing in the flow chart in FIG. 18.

When it is determined in step S1002 that the operation flag is in an ON state, an error processing (step S1006) is executed and the processing in the flow chart in FIG. 18 is ended.

The processing in step S1005 in FIG. 18 is explained with reference to FIG. 19. Herein, it is assumed that a motion program number read in step S1003 is "No. 1" and the motion program with the motion program number "No. 1" shown in FIG. 17 is executed. The control section 6 in the motion control section 5 decodes the motion program shown in FIG. 17 as follows (step S1007).

| G01 | POINT-TO-POINT positioning operation |
| X100. | Position at a target position = 100 mm on the X axis |
| F1000. | Feed speed = 1000 mm/min |

After the program is decoded by the control section 6, it transmits a drive signal indicating a positional instruction for positioning under the conditions of the target position=100 mm and the feed speed of 1000 mm/min especially to the servo amplifier 11 (precisely, the interface section 12) corresponding to the X-axis (step S1008). When the interface section 12 receives the drive signal, the servo amplifier 11 rotates the servo motor 13 up to the target position at the speed indicated by the received drive signal. The encoder 14 always detects the position of the servo motor 13, and transmits an operation-complete signal indicating completion of the operation in the servo motor 13, when the servo motor 13 reaches the target position, to the motion control section 5 through the interface section 12 in the servo amplifier 11. The control section 6 in the motion control section 5 confirms that the servo motor 13 has reached the target position by checking whether a operation-complete signal for this operation has been received or not (step S1009).

When it is determined in step S1009 that the motion control section 5 has detected the completion of the operation of the servo motor 13, the operation flag is changed to an OFF state (step S1010), and ends the processing in the flow chart in FIG. 19, namely the processing of the motion program. When it is determined in step S1009 that the motion control section did not detect the completion of the operation of the servo motor 13, the situation indicates that the motion program is operating, then the checking as to whether the operation is completed or not in step S1009 is repeated.

As described above, with this conventional type of positioning control unit, the specified motion program is executed as soon as the operational conditions showing the sequence program holds, and positioning by the servo motor is achieved according to the motion program.

FIG. 20 is a block diagram showing another example of the positioning control unit based on the conventional technology. In FIG. 20, the conventional type of positioning control unit comprises a servo motor 13 as the equipment to be controlled, an encoder 14 for detecting the position and the speed of the servo motor 13, an encoder 23 mounted on a drive shaft (not shown) for a conveyor for detecting the rotation speed of the drive shaft, a servo amplifier 11 for driving the servo motor 13, a motion control section 5 for transmitting a drive signal for driving the servo motor 13 to the servo amplifier 11, and a sequence control section 1 for transmitting a control signal to the motion control section 5 according to a preset sequence program.

The sequence control section 1 comprises a sequence program section 3 for storing therein a sequence program shown in FIG. 16, a control section 2 for generating a start signal or the like according to the sequence program stored in the sequence program section 3, and an interface section 4 for transmitting the start signal generated in the control section 2 to the motion control section 5.

The motion control section 5 comprises an interface section 8 for receiving the start signal transmitted from the sequence control section 1 (precisely, the interface section 4), a motion program section 9 for storing therein a motion program shown in FIG. 21 (indicated by G code which is generally used in a machine tool when a servo motor is driven), a control section 6 for generating a drive signal according to the start signal received in the interface section 8 as well as according to the motion program stored in the program section 9, an interface section 10 for transmitting the drive signal generated in the control section 6 to the servo amplifier 11, an interface section 24 for receiving a number of pulses according to the speed detected by the encoder 23, and a memory 7 for storing thereon a number of pulses or the like received in the interface section 24. The motion program in FIG. 21 is an example of the program set by a user using a peripheral equipment such as a keyboard or the like.

The servo amplifier 11 has an interface section 12 for receiving the drive signal transmitted from the motion control section 5 (precisely, the interface section 10), and drives the servo motor 13 according to the drive signal received in the interface section 12 as well as according to the position signal and speed signal detected in the encoder 14.

Operation of this conventional type of positioning control unit is described below. In the sequence control section 1, the control section 2 reads the sequence program shown in FIG. 16 from the sequence program section 3. The control section 2 determines whether an operating condition in the sequence program holds or not. When it is determined that the operating condition holds, the control section 2 generates a program-number signal indicating a number of the motion program ("No. 1" herein) to be executed as well as generates a start signal, and transmits these signals to the interface section 4. The inter face section 4 receives the program-number signal and the start signal transmitted from the control section 2 and transmits these signals to the motion control section 5 (precisely, the interface section 8).

As the operation in the motion control section 5 is the same as that shown in the flow charts in FIG. 18 and FIG. 19, their description is omitted herein. A concrete processing according to the motion program shown in FIG. 21 is described with reference to FIG. 22. In step S1007 in FIG. 19, the control section 6 in the motion control section 5 decodes the motion program shown in FIG. 21 as follows.

| G95 | Feed speed changed to a value per 1 rev of a main shaft |
|---|---|
| X100. | Position at a target position = 100 mm on the X axis |
| F10. | Feed speed = 10 mm/rev |

The control section 6 transmits, according to the motion program shown in FIG. 21, a drive signal indicating a positional instruction for positioning under the conditions of the target position=100 mm and the feed speed of 10 mm/rev to the servo amplifier 11 (precisely, the interface section 12) corresponding to the X-axis. When the interface section 12 receives the drive signal, the servo amplifier 11 rotates the servo motor 13 up to the target position at the speed indicated by the received drive signal.

While this rotational operation is being executed, the control section 6 in the motion control section 5 reads a number of pulses detected in the encoder 23 for a prespecified period of time (described as encoder-detection value hereinafter) from the interface section 24 (step S1101). This encoder-detection value indicates a rotational speed of a drive shaft for the conveyor or the like. The control section 6 writes the encoder-detection value in the memory 7 as current value (step S1102). Thus, a current time value indicates the latest encoder-detection value. Then, ΔP is computed by subtracting the previous encoder-detection value (previous value) from the current value according to the expression described below (step S1103).

$$\Delta P = \text{current value} - \text{previous value}$$

Herein, ΔP indicates a variation, namely a rate of acceleration and deceleration between the detected two rotational speeds (in this case, current value and the previous value), and is written in the memory 7 in the same manner as the current value.

Then, ΔL is computed according to the expression described below using the ΔP computed in step S1103, number of pulses per rev (has been written in the memory 7) as a prespecified reference, and a feed speed F (10 mm/rev) set in the motion program (step S1104).

$$\Delta L = F \times \Delta P / \text{number of pulses per rev}$$

Herein, ΔP/number of pulses per rev indicates an increase or a decrease of the number of rev per prespecified period of time, and by multiplying the above value by the feed speed F set in the servo motor 13, a value ΔL of increase/decrease of rotational speed for following the rotational speed of the drive shaft detected in the encoder 23 can be obtained.

The control section 6 transmits a signal indicating the ΔL computed in step S1104 to the interface section 10 as an instruction value for the servo amplifier. The interface section 10 transmits the received ΔL signal to the servo amplifier 11 (precisely, the interface section 12) (step S1105), and the servo amplifier 11 drives the servo motor 13 at the feed speed increased or decreased according to this ΔL signal. With this operation, the rotational drive of the servo motor 13 in synchronism to the operational speed of a different driving system such as the drive shaft for the conveyor can be achieved.

After the processing in step S1105, the value indicating the current value is set as the previous value for the next processing (step S1106). The ΔP, the current value, the previous value and the number of pulses per rev of the motor are stored in the memory 7 as shown in FIG. 23.

As described above, with this conventional type of positioning control unit, it is possible to achieve setting of a servo motor according to the motion program executed as soon as the operational condition indicated in the sequence program holds, and also a synchronous operation to the servo motor by changing a feed speed of the servo motor according to a servo-amplifier instruction value computed from the rotational speed (herein, number of pulses) of the drive shaft for a conveyor.

In the example of the conventional type of position control unit, however, when the processing (processing according to an instruction for the previous sequence program in this case) executed in the motion control section 5 is in operation, a start signal for starting the processing according to an instruction for a new sequence program can not be accepted and an error processing is executed. Accordingly, in order to start the processing according to an instruction for a new sequence program, when it is determined that the processing according to an instruction for the previous sequence program has ended, then only the processing of reading in a new sequence program is started anew, therefore, a plurality of sequence programs can not continuously be executed without any intermission.

Furthermore, if the start flag for starting the processing according to an instruction for a sequence program is always in an ON state, the processing according to an instruction for a new sequence program can not be executed.

In an another example of the conventional type of position control unit, a prespecified period of time is required for detecting rotational speed of a drive shaft for a conveyor, so that, for example, when the rotational speed in the drive shaft for a conveyor increases abruptly, a rotational position of the drive shaft after the prespecified period of time is also largely displaced. As the servo motor follows the speed after the occurrence of this large displacement, there occurs a divergence equivalent to this displacement. This divergence in the timing of the synchronous operation of the servo motor is varies depending on a variation rate in the rotational speed of the drive shaft for the conveyor, therefore, variations in a displacement rate may disadvantageously occur.

In addition, by fixedly setting the prespecified period of time for detecting the speed to a comparatively large value, sufficient speed variation can be obtained in the drive shaft of the conveyor, therefore, abrupt speed variations can not instantly be detected by making the prespecified period of time smaller.

SUMMARY OF THE INVENTION

It is an object of the present invention to obtain a positioning control unit for receiving a start signal of a next promotion program even when one motion program is in operation and for preventing variations in the amount of displacement of the synchronous positions in a synchronous operation of a servo motor.

With the present invention, a sequence control section outputs the start signals for a motion program specified within a sequence program to be executed to a motion control section, and a motion control section continuously receives the start signals and execute the motion program specified thereby. Thus, the sequence control section can output a start signal for the next motion program without checking whether the operation of motion program is completed or not, and continuous execution of the motion program can efficiently and speedily be performed. Therefore, the equipment as an object for control can smoothly be operated through a servo amplifier.

With the present invention, a motion control section receives the start signals for a next motion program even when one motion program is in operation, and continuously executes the motion program indicated by the start signal received next after the operation of the motion program is completed without intermission. Thus, continuous execution of the motion program can efficiently and speedily be performed. Therefore, the equipment as an object for control can smoothly be operated through a servo amplifier.

With the present invention, a motion control section comprises a start signal storage section for storing therein a plurality of signals for motion programs continuously received. Thus, a plurality of motion programs can continuously be executed without intermission, and continuous execution of the plurality of motion programs can efficiently and speedily be performed. Therefore, the complicated operations of the equipment as an object for control can smoothly be controlled through a servo amplifier.

With the present invention, a motion control section reads, from a start signal storage section for storing therein a plurality of start signals for motion programs continuously received, a motion program to be executed next and execute the motion program after the operation of a motion program is completed. Thus, the motion programs can accurately and speedily be execute in order of being outputted from a sequence control section. Therefore, complicated operations of the equipment as an object for control can smoothly be controlled through a servo amplifier.

With the present invention, a motion control section stores therein a number of counts of start signals for continuously received motion programs each as a count value, adds the count value when a start signal for a motion program is received, and subtracts the count value when the operation of the motion program is completed. Thus, a number of motion programs to be executed next can be managed, furthermore, existence of a motion program to be continuously executed next can be confirmed by referring to the count values.

With the present invention, a motion control section stores therein a number of continuously operable motion programs as a maximum count value, and does not add a count value when the count value exceeds the maximum count value. Thus, it is possible to prevent a continuous operation of a large number of motion programs requiring a long time, furthermore, prevent a wasteful use of storage capacity for storing start signals for motion programs or the like.

With the present invention, a maximum count value is indicated in a motion program. Thus, a maximum count value can be set for each motion program, and optimal motion programs according to control contents indicated by the motion programs can continuously be operated.

With the present invention, a sequence control section outputs the start signals for motion programs specified within a sequence program to be executed to a motion control section, and the motion control section receives the start signal and not only executes the specified motion program but also can restart an operation according to the motion program by receiving a restart signal having been inputted in a signal input section. Thus, a motion program can easily be restarted without requiring preparation of a plurality of motion programs each having the same contents.

With the present invention, a motion control section determines whether a motion program immediately after its completion is to be restarted or not by checking the restart signal information stored in a data storage section. Therefore, a motion program can accurately be restarted.

With the present invention, a motion control section receives, even when a motion program is in operation, a restart signal and a change restart signal information on an ON state. Therefore, a continuous and efficient restarting operation of motion programs can be executed before the operation of a motion program is completed.

With the present invention, a motion control section receives, after the operation of a motion program is completed, a restart signal and a change restart signal information on an ON state. Therefore, a restarting operation of a motion program can be executed at a desired timing.

With the present invention, a sequence control section outputs a start signal for a motion program specified within a sequence program to be executed to a motion control section, and a motion control section receives the start signal and execute the specified motion program, and the motion control section also outputs, for the purpose of synchronizing equipment as an object for control to equipment as an object for synchronization, a drive instruction according to driving speed to a servo amplifier at a timing based on the driving speed of the equipment as an object for synchronization detected by a speed detecting section. Thus, it is possible to resolve variations in positions of equipment as an object for synchronization occurring at the time of starting a synchronous operation according to changes in the driving speed of the equipment as an object for synchronization. Therefore, a synchronous operation to the equipment as an object for control can accurately be achieved.

With the present invention, a motion control section determines a timing of outputting a driving instruction as a case where a count value counted by accumulating a rate of acceleration or declaration of a equipment as an object for synchronization from driving speed detected in a speed detecting section exceeds a determination count value stored in a data storage section. Therefore, a synchronous operation to the equipment as an object for control can more accurately be achieved by resolving variations in positions of equipment as an object for synchronization occurring at the time of starting a synchronous operation according to changes in the driving speed of the equipment as an object for synchronization.

With the present invention, a determination count value is indicated in a motion program. Thus, a determination count value can be set for each motion program. Therefore, it is possible to achieve an optimal synchronous operation to the equipment as an object for control according to control contents indicated in the motion program.

With the present invention, a motion control section outputs a speed increase/decrease signal, as a drive instruction, computed by using a rate of acceleration or declaration of the equipment as an object for synchronization computed from driving speed detected in a speed detecting section and speed shown in a positioning instruction. Therefore, the equipment as an object for control can accurately be synchronized and operated to the equipment as an object for synchronization at the speed according to the rate of acceleration or declaration thereof.

Other objects and features of this invention will become apparent from the following description with reference to the accompanying drawings.

BRIEF DESCRIPTION OF THE DRAWINGS

FIG. 9 is a flow chart showing an operation of the positioning control unit according to Embodiment 2;

FIG. 10 explains the values stored in a memory in the positioning control unit according to Embodiment 2;

FIG. 12 shows an example of a motion program in the positioning control unit according to Embodiment 3;

FIG. 14 explains the values stored in a memory in the positioning control unit according to Embodiment 3;

FIG. 20 is a block diagram showing general configuration of another example of the positioning control unit based on a conventional technology;

FIG. 21 shows an example of a motion program according to an another example of the positioning control unit based on the conventional technology;

FIG. 23 explains the values stored in a memory in another example of the positioning control unit based on the conventional technology.

DESCRIPTION OF THE PREFERRED EMBODIMENTS

Detailed description is made hereinafter for preferred embodiments of the positioning control unit according to the present invention with reference to the related drawings. It should be noted that the present invention is not limited by those embodiments.

Figure 1:
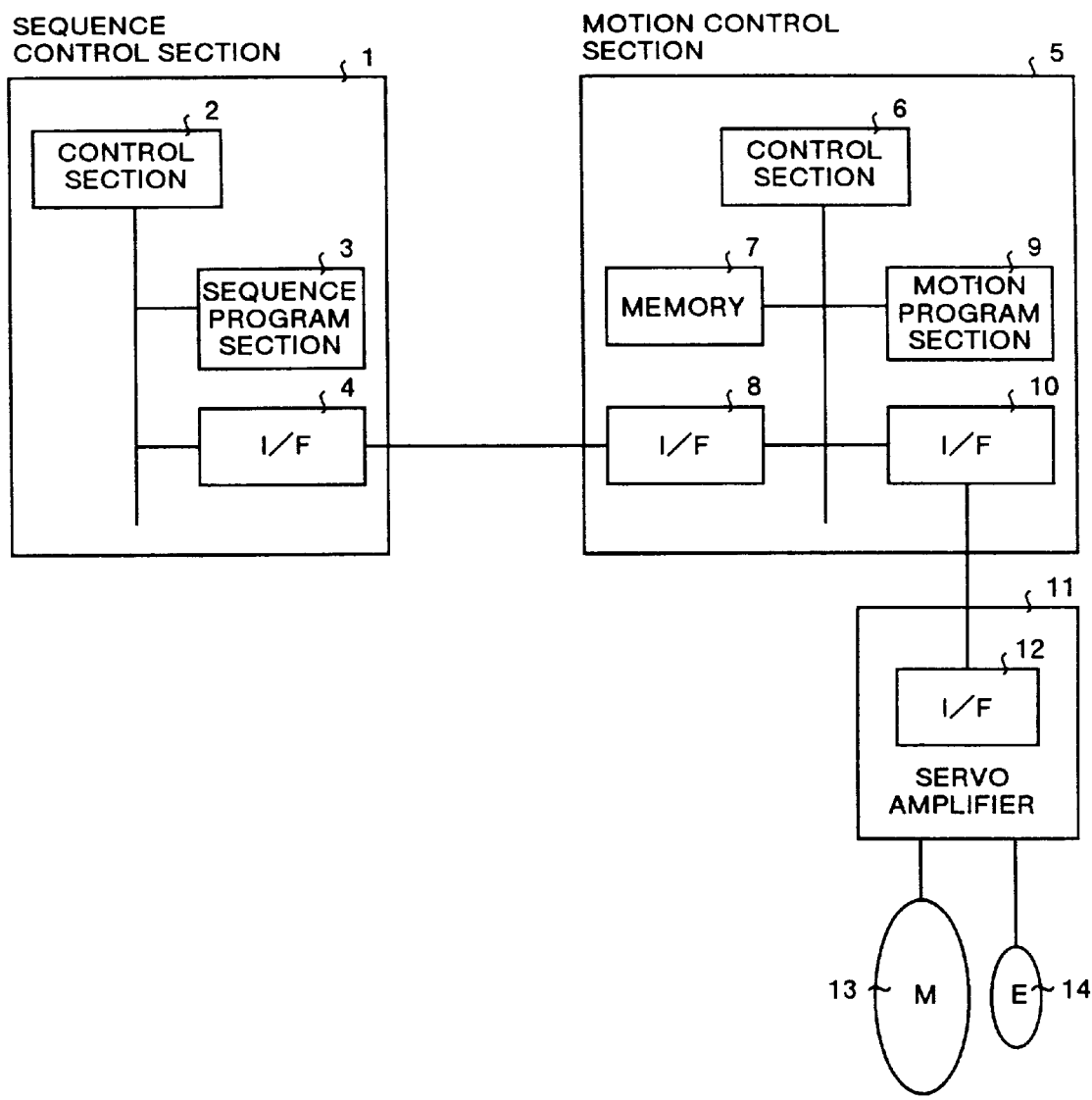
FIG. 1 is a block diagram showing general configuration of a positioning control unit according to Embodiment 1.

FIG. 1 is a block diagram showing general configuration of a positioning control unit according to the Embodiment 1. In FIG. 1, the positioning control unit according to the Embodiment 1 comprises a servo motor 13 as the equipment to be controlled, an encoder 14 for detecting a position and a speed of the servo motor 13, a servo amplifier 11 for driving the servo motor 13, a motion control section 5 for transmitting a drive signal for driving the servo motor 13 to the servo amplifier 11, and a sequence control section 1 for transmitting a control signal to the motion control section 5 according to a sequence program.

Figure 2:
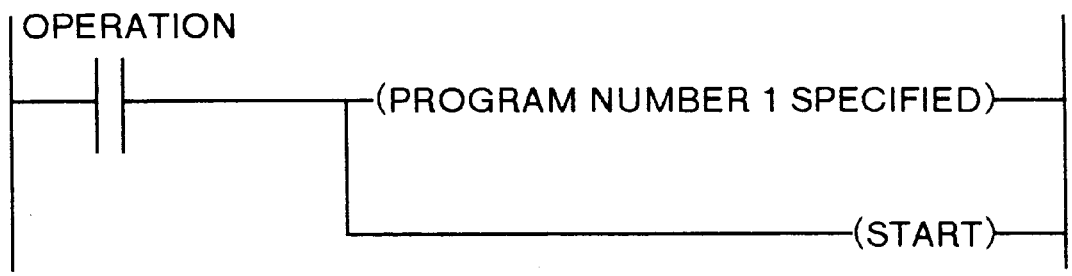
FIG. 2 shows an example of a sequence program in the positioning control unit according to Embodiment 1.

The sequence control section 1 comprises a program section 3 for storing therein a sequence program shown in FIG. 2, a control section 2 for generating a start signal or the like according to the sequence program stored in the sequence program section 3, and an interface section 4 for transmitting the start signal or the like generated in the control section 2 to the motion control section 5. The sequence program shown in FIG. 2 is an example of the program set by a user using a peripheral equipment (not shown in the figure) such as a keyboard or the like.

Figure 3:
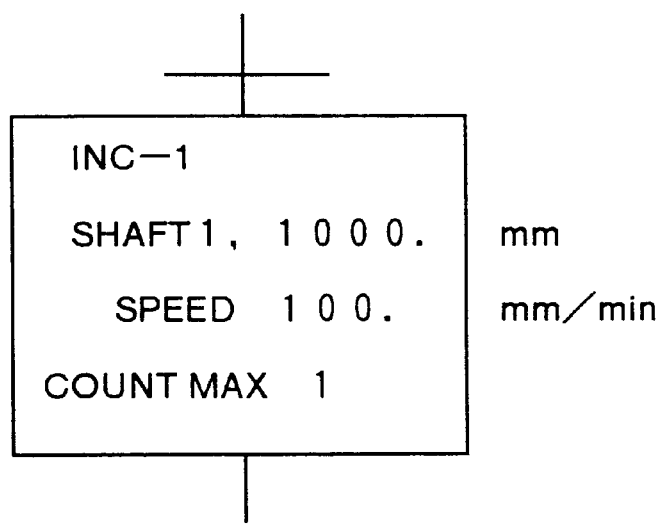
FIG. 3 shows an example of a motion program in the positioning control unit according to Embodiment 1.

The motion control section 5 comprises an interface section 8 for receiving the start signal or the like transmitted from the sequence control section 1 (precisely, the interface section 4), a motion program section 9 for storing therein a motion program shown in FIG. 3, a control section 6 for generating a drive signal according to the start signal received in the interface section 8 as well as according to the motion program stored in the motion program section 9, a memory 7 for storing therein data used in the control section 6, and an interface section 10 for transmitting the drive signal generated in the control section 6 to the servo amplifier 11. The motion program shown in FIG. 3 is an example of the program set by a user using a peripheral equipment (not shown in the figure) such as a keyboard or the like.

The interface section 8 has a memory (not shown) capable of successively storing therein start signals transmitted from the sequence control section 1, each start signal corresponding to each of the continuously transmitted sequence programs can be read by the control section 6.

The servo amplifier 11 has an interface section 12 for receiving the drive signal transmitted from the motion control section 5 (precisely, the interface section 10), and drives the servo motor 13 according to the drive signal received in the interface section 12 as well as according to the position signal and speed signal detected in the encoder 14.

Operation of this positioning control unit is described below. In the sequence control section 1, the control section 2 reads the sequence program shown in FIG. 2 from the sequence program section 3. The control section 2 determines whether an operating condition indicated in the sequence program holds or not. When it is determined that the operating condition holds, the control section 2 generates a program-number signal indicating a number of the motion program ("No. 1" herein) to be executed as well as generates a start signal for promoting a start of the motion program, and transmits these signals to the interface section 4. The interface section 4 receives the program-number signal and the start signal transmitted from the control section 2 and transmits these signals to the motion control section 5 (precisely, the interface section 8).

Operation in the motion control section 5 is explained below with reference to the flow charts shown in FIG. 4 and FIG. 5. As shown, in FIG. 4, the control section 6 in the motion control section 5 determines whether the interface section 8 has received a start signal or not. Especially in the interface section 8, a start flag indicating an ON/OFF state of the start signal is prepared, and when the start signal is received, this start flag is changed to an ON state. The control section 6 determines whether this start flag is in an ON state or not (step S101). When it is determined in step S101 that the start flag is not in an ON state, the processing in the flow chart in FIG. 4 is ended.

If it is determined in step S101 that the start flag is in the ON state, it is determined whether an operation flag indicating an operating state of processing to be executed (in this case, processing according to an instruction of the previous sequence program) in the motion control section 5 is in an ON state or not (step S102). When it is determined in step S102 that the operation flag is not in an ON state, namely when the operation flag is in an OFF state, the motion control section 5 acquires a program number from the program-number signal received in the interface section 8, and specifies a motion program indicated by the program number from the motion program section 9 (step S103). With this operation, the start flag is changed to an OFF state, and the operation flag is changed to an ON state (step S104). The motion control section performs processing (described later) according to the motion program specified in step S103 (step S105), and ends the processing in the flow chart in FIG. 4.

Figure 4:
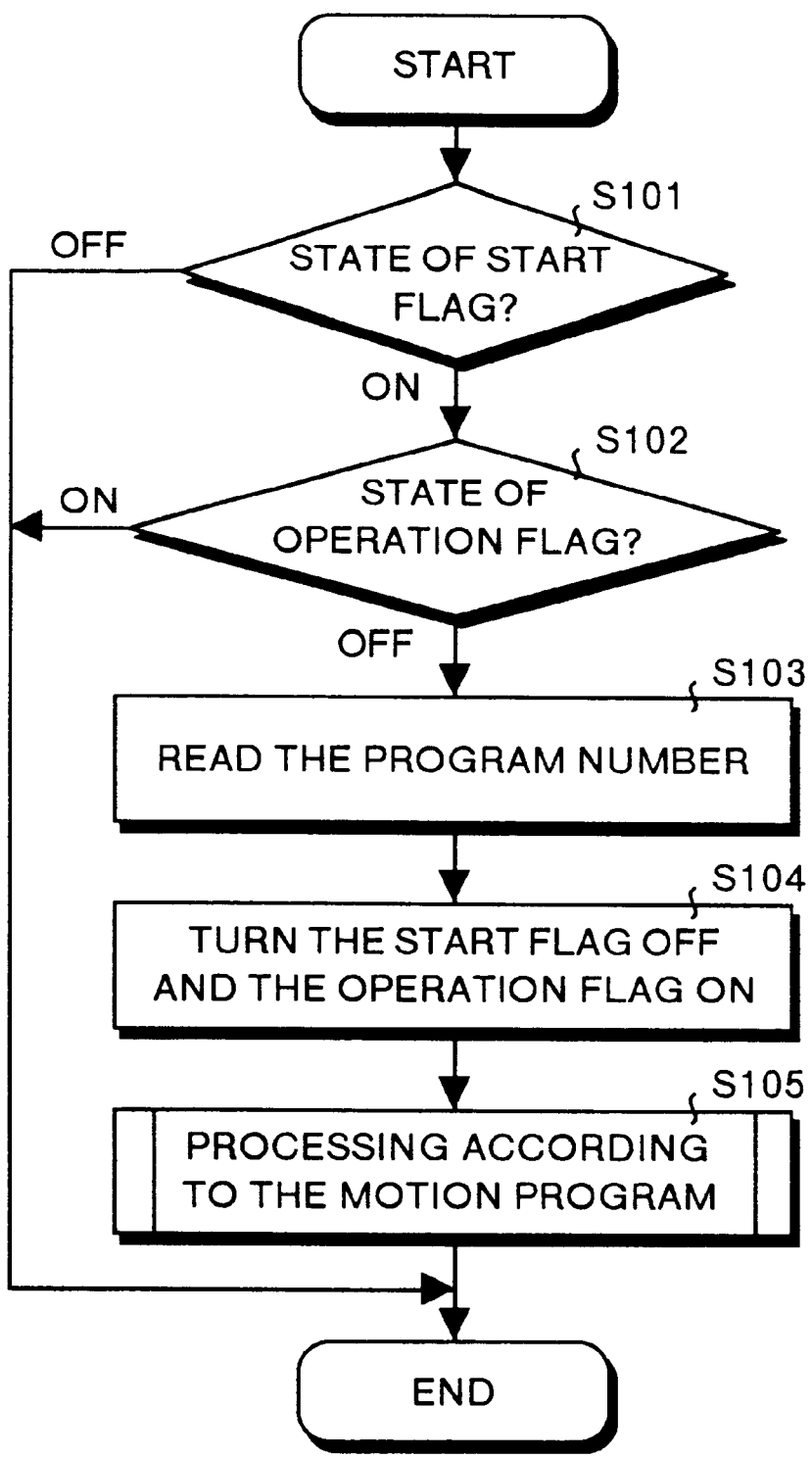
FIG. 4 is a flow chart showing an operation of the positioning control unit according to Embodiment 1.

When it is determined in step S102 that the operation flag shows an ON state, no error processing is executed and the processing in the flow chart in FIG. 4 is ended.

The processing in step S105 in FIG. 4 is explained with reference to FIG. 5. Herein, it is assumed that a motion program number acquired in step S103 indicates "No. 1" and the motion program with the motion program number "No. 1" shown in FIG. 3 is executed. The control section 6 in the motion control section 5 initializes a starting count value indicating how many times the start flag is changed from an OFF state to an ON state (step S201). This starting count value means how many times the interface section 8 receives the start signal during the operation of the motion program, namely a number of motion programs to continuously be operated.

Then, the control section 6 decodes the motion program shown in FIG. 3 as described below (step S202).

| | |
|---|---|
| INC-1 | Positioning operation according to an instruction by POINT-TO-POINT increased value |
| Shaft 1, 1000. | Position at a position of 1000 mm in the + direction from the current position on the shaft 1 |
| Speed 100. | Feed speed = 100 mm/min |
| Count MAX. 1 | Maximum starting count value = 1 |

Figure 6:
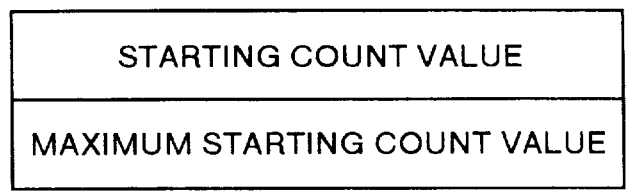
FIG. 6 explains the values stored in a memory in the positioning control unit according to Embodiment 1.

Herein, the maximum starting count value indicates a maximum number of continuously operated motion programs, and is stored in the memory 7 as shown in FIG. 6 together with the starting count value (step S203). Accordingly, a maximum count value can be set for each motion program, therefore, it is possible to achieve an optimal continuous operation of motion programs according to control contents in the motion programs.

After the processing in step S203, a drive signal indicating that positioning of the shaft 1 is executed at a position of 1000 mm in the+direction from the current position at feed speed of 100 mm/min is transmitted especially to the servo amplifier 11 (precisely, the interface section 12) corresponding to the shaft 1 (step S204). When the interface section 12 receives the drive signal, the servo amplifier 11 rotates the servo motor 13 up to the target position at speed indicated by the received drive signal. The encoder 14 always detects the position of the servo motor 13, and transmits an operation-complete signal indicating completion of the operation in the servo motor 13, when the servo motor 13 reaches the target position, to the motion control section 5 through the interface section 12 in the servo amplifier 11. The control section 6 in the motion control section 5 confirms that the servo motor 13 has reached the target position by checking whether a operation-complete signal for this operation has been received or not (step S205).

When it is determined in step S205 that the control section 6 has detected the completion of the operation of the servo motor 13, it is determined whether the starting count value is equal to zero or not (step S206). When it is determined in step S206 that the starting count value is zero, the operation flag is changed to an OFF state (step S207) and the processing shown in the flow chart in FIG. 5, namely the processing of the motion program is ended.

When it is determined in step S206 that the starting count value is not equal to zero, namely when the interface section 8 receives the start signal with the motion program in operation, a result of subtracting 1 from the starting count value is written anew in the memory 7 as a starting count value. Namely, the starting count value is decremented here (step S212).

The control section 6 acquires a program number from the oldest program-number signal received and stored in the interface section 8, and specifies a motion program indicated by the program number from the motion program section 9 (step S213). The processing is returned to step S202, and the execution of the specified motion program is started.

When it is determined in step S205 that the completion of the operation of the servo motor 13 is not detected, namely when the motion program is in operation, it is determined whether the start flag is in an ON state or not (step S208). If it is determined in step S208 that the start flag is in an ON state, it is determined to whether a starting count value has a value equal to or more than the maximum starting count value or not (step S209). With this determination, it is possible to prevent a continuous operation of a large number of motion programs requiring a long time, and further prevent a wasteful use of storage capacity for storing start signals for motion programs or the like.

If it is determined in step S209 that the starting count value has a value which is not equal to or more than the maximum starting count value, a result of adding 1 to the starting count value is written anew in the memory 7 as a starting count value. Namely, the starting count value is incremented here (step S212). Then, the start flag is changed to an OFF state (step S211).

After the processing in step S211, a case where the start flag does not show the ON state in step S208 and a case where the starting count value shows the maximum starting count value or a value more than that show the motion program in operation, and confirmation of completion of the operation in step S205 is repeated.

As described above, with the positioning control unit according to Embodiment 1, when a specified motion program is executed as soon as an operating condition indicated by a sequence program holds and a start signal for a new sequence program is received with the motion program in operation, a starting count value indicating a number of times of receiving the signals is added. Thus, a motion program to be executed next can speedily be operated without intermission by checking the starting count value after the motion program is completed. Therefore, it is possible to achieve smooth positioning of a servo motor based on a plurality of motion programs to continuously be executed.

Figure 7:
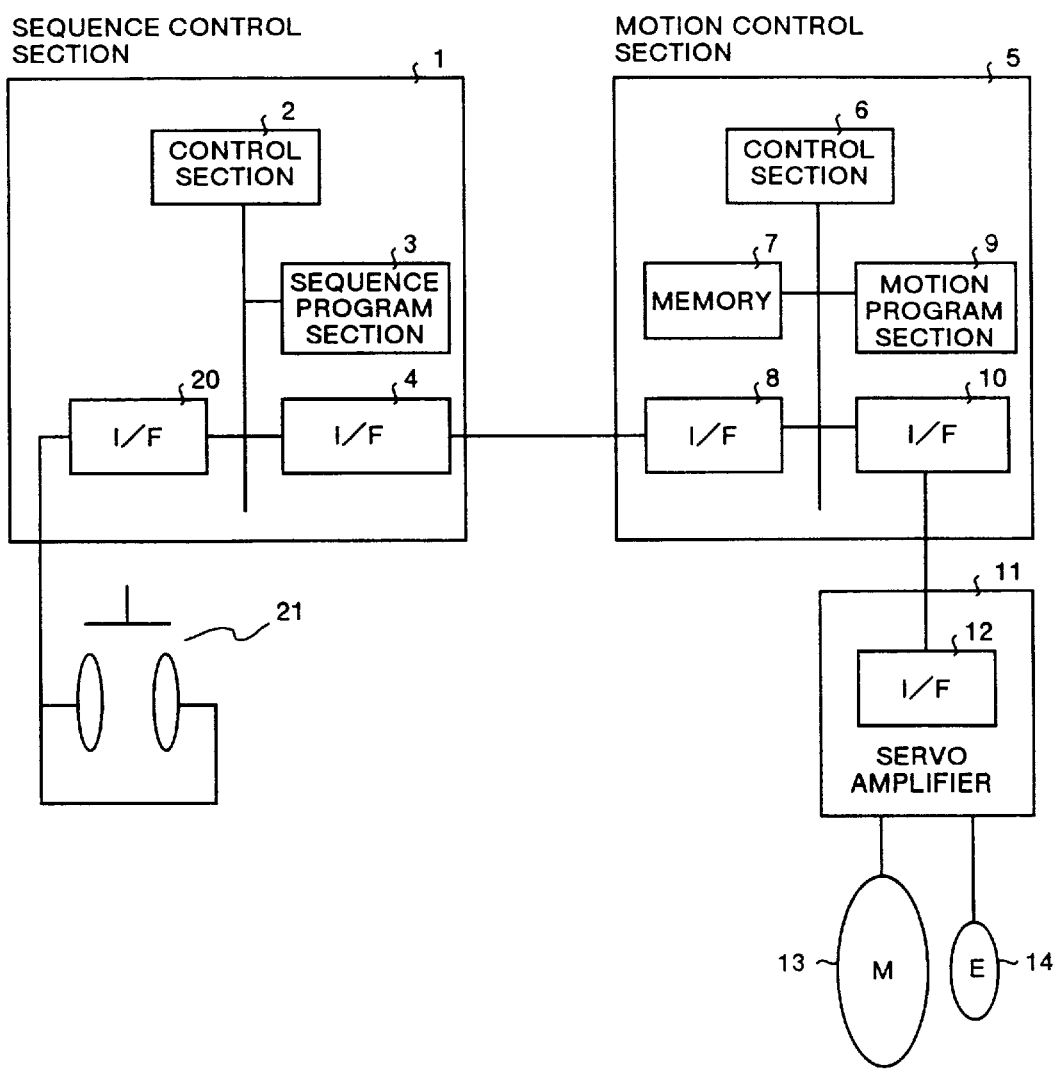
FIG. 7 is a block diagram showing general configuration of a positioning control unit according to Embodiment 2.

FIG. 7 is a block diagram showing general configuration of a positioning control unit according to Embodiment 2. In FIG. 7, the positioning control unit according to Embodiment 2 comprises a servo motor 13 as the equipment to be controlled, an encoder 14 for detecting a position and a speed of the servo motor 13, a servo amplifier 11 for driving the servo motor 13, a motion control section 5 for transmitting a drive signal for driving the servo motor 13 to the servo amplifier 11, a sequence control section 1 for transmitting a control signal to the motion control section 5 according to a sequence program, and a signal input section 21 capable of accepting an input form a user.

The sequence control section 1 comprises a program section 3 for storing therein a sequence program as shown in FIG. 2, a control section 2 for generating a start signal or the like according to the sequence program stored in the sequence program section 3, an interface section 20 for receiving a signal inputted through the signal input section 21 and identifying a restart signal, and an interface section 4 for transmitting the start signal or the like generated in the control section 2 as well as transmitting the restart signal received in the interface section 20 to the motion control section 5.

Figure 8:
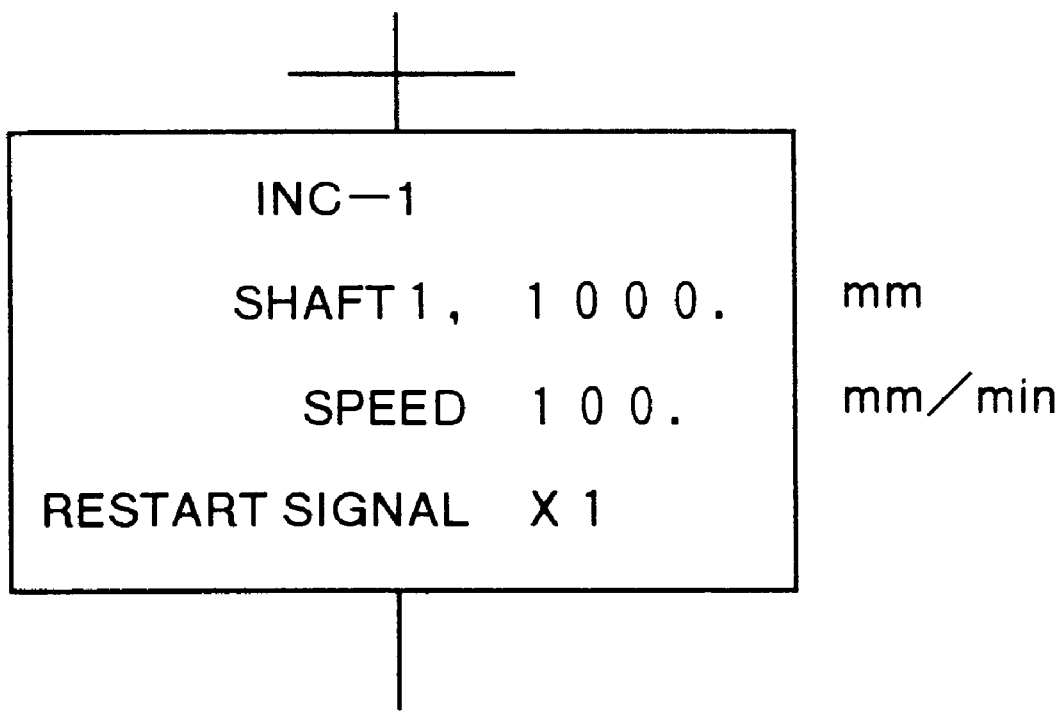
FIG. 8 shows an example of a motion program in the positioning control unit according to Embodiment 2.

The motion control section 5 comprises an interface section 8 for receiving the start signal or the like as well as for receiving the restart signal transmitted from the sequence control section 1 (precisely, the interface section 4), a motion program section 9 for storing therein a motion program shown in FIG. 8, a control section 6 for generating a drive signal according to the start signal received in the interface section 8 as well as according to the motion program stored in the motion program section 9, a memory 7 for storing therein data used in the control section 6, and an interface section 10 for transmitting the drive signal generated in the control section 6 to the servo amplifier 11. The motion program shown in FIG. 8 is an example of the program set by a user using a peripheral equipment (not shown in the figure) such as a keyboard or the like.

The servo amplifier 11 has an interface section 12 for receiving the drive signal transmitted from the motion control section 5 (precisely, the interface section 10), and drives the servo motor 13 according to the drive signal received in the interface section 12 as well as according to the position signal and speed signal detected in the encoder 14.

Operation of this positioning control unit is described below. In the sequence control section 1, the control section 2 reads the sequence program shown in FIG. 2 from the sequence program section 3. The control section 2 determines whether an operating condition indicated in the sequence program holds or not. When it is determined that the operating condition holds, the control section 2 generates a program-number signal indicating a number of the motion program ("No. 1" herein) to be executed as well as generates a start signal for promoting a start of the motion program, and transmits these signals to the interface section 4. The interface section 4 receives the program-number signal and the start signal transmitted from the control section 2 and transmits these signals to the motion control section 5 (precisely, the interface section 8).

Operation in the motion control section 5 is explained with reference to the flow charts shown in FIG. 4 and FIG. 9. The flow chart shown in FIG. 4 has been described in Embodiment 1, so that description thereof is omitted. Thus, the processing in step S105 of FIG. 4, namely the processing for a motion program is only explained.

Herein, it is assumed that a motion program number acquired in step S105 shows "No. 1" and the motion program with the motion program number "No. 1" shown in FIG. 8 is executed. In FIG. 9, at first, the control section 6 in the motion control section 5 initializes restart signal information indicating presence or absence of the restart signal from the restart signal input section 21 (step S301). This restart signal information is data to be stored in the memory 7 as shown in FIG. 10 through the interface section 20, interface section 4 and interface section 8 when the restart signal is issued from the signal input section 21.

The control section 6 decodes the motion program shown in FIG. 8 as described below (step S302).

| | |
|---|---|
| INC-1 | Positioning operation according to an instruction by POINT-TO-POINT increased value |
| Shaft 1, 1000. | Position at a position of 1000 mm in the + direction from the current position on the shaft 1 |
| Speed 100. | Feed speed = 100 mm/min |
| Restart signal X1 | Signal = X1 recognized as a restart signal |

Herein, the restart signal X1 is a signal recognized, when the interface section 20 receives the signal indicating "X1", as a restart signal, and can change the restart signal information to an ON state even when the motion program is in operation.

After the processing in step S302, a drive signal indicating that positioning of the shaft 1 is executed at a position of 1000 mm in the+direction from the current position at feed speed of 100 mm/min is transmitted especially to the servo amplifier 11 (precisely, the interface section 12) corresponding to the shaft 1 (step S303). When the interface section 12 receives the drive signal, the servo amplifier 11 rotates the servo motor 13 up to the target position at speed indicated by the received drive signal. The encoder 14 always detects the position of the servo motor 13, and transmits an operation-complete signal indicating completion of the operation in the servo motor 13, when the servo motor 13 reaches the target position, to the motion control section 5 through the interface section 12 in the servo amplifier 11. The control section 6 in the motion control section 5 confirms that the servo motor 13 has reached the target position by checking whether a operation-complete signal for this operation has been received or not (step S304).

When it is determined in step S304 that the control section 6 has detected the completion of the operation of the servo motor 13, it is determined whether the restart signal information indicates an ON state or not (step S305). When it is determined in step S305 that the restart signal information does not indicate an ON state, namely when the restart signal information indicates an OFF state, the operation flag is changed to an OFF state (step S306) and the processing shown in the flow chart in FIG. 9, namely the processing for the motion program is ended.

When it is determined in step S305 that the restart signal information indicates an ON state, namely when a restart signal is inputted from the signal input section 21 while the motion program is in operation or immediately after the operation is completed, the processing is returned to step S301 so as to restart the motion program of which operation has just completed. When it is detected in step S304 that the operation of the servo motor 13 has not completed, this indicates that the motion program is in operation, and confirmation of completion of the operation in step S304 is repeated.

As described above, with the positioning control unit according to Embodiment 2, when a specified motion program is executed as soon as an operating condition indicated by a sequence program holds and a restart signal is issued from the signal input section with the motion program in operation, after the motion program in operation is completed, the same motion program can be operated again. Thus, there is no need to prepare sequence programs for a number of times required for making the servo motor repeatedly execute the same operation, and the same motion program can repeatedly and speedily be operated without intermission only by a simple input operation from the signal input section. Therefore, it is possible to achieve a desired smooth positioning of a servo motor.

In addition, the motion control section 5 can receive, even when the motion program is in operation, a restart signal and change the restart signal information to an ON state. Thus, a continuous and efficient restarting operation of motion programs can be executed before the operation of a motion program is completed, and further after the operation of the motion program is completed, the motion control section 5 can also receive a restart signal and change the restart signal information to an ON state. Therefore, a restarting operation of a motion program can be executed at a desired timing.

Figure 11:
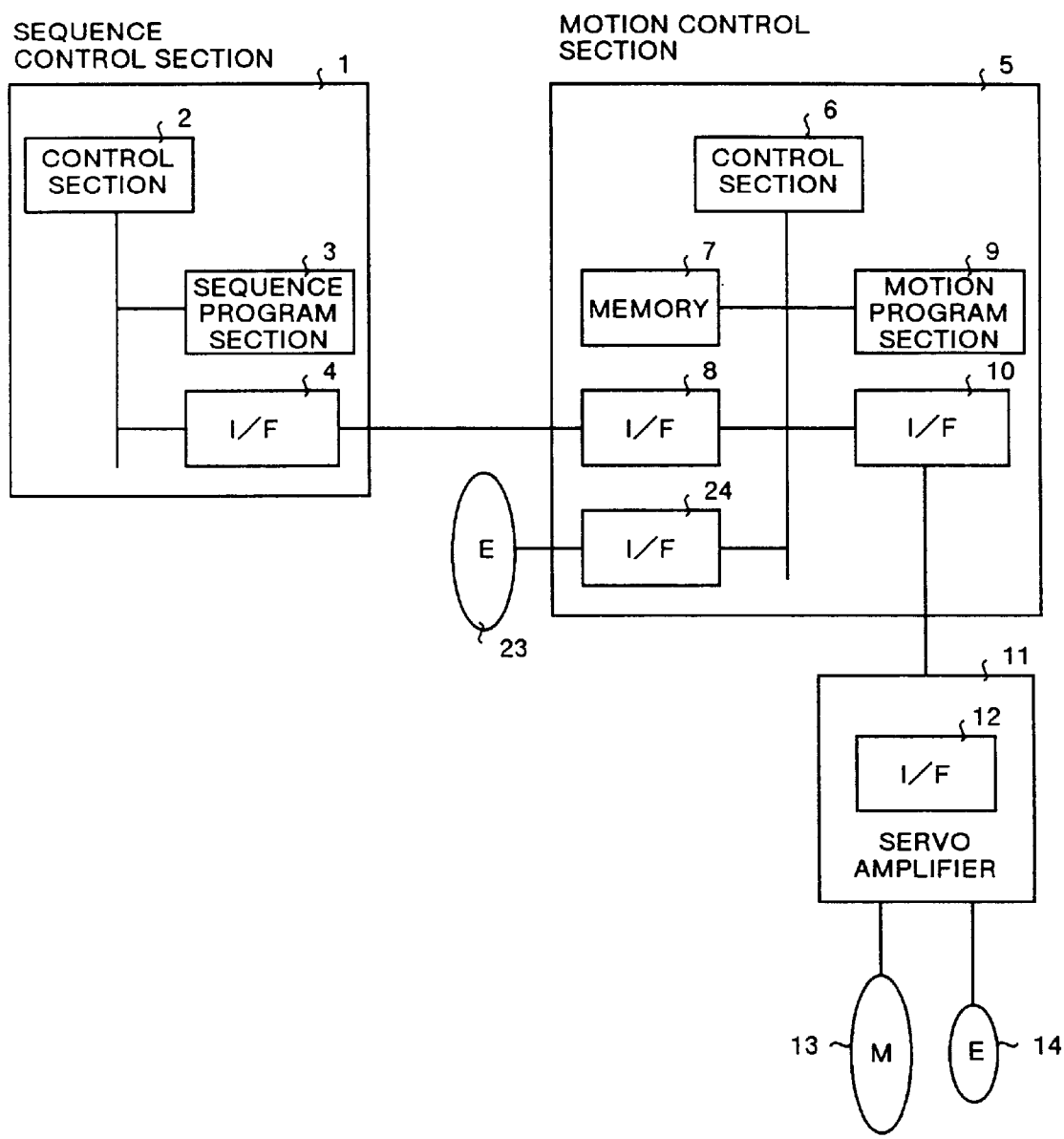
FIG. 11 is a block diagram showing general configuration of a positioning control unit according to Embodiment 3.

FIG. 11 is a block diagram showing a positioning control unit according to Embodiment 3. In FIG. 11, this positioning control unit comprises a servo motor 13 as the equipment to be controlled, an encoder 14 for detecting a position and a speed of the servo motor 13, an encoder 23 mounted on a drive shaft (not shown in the figure) of a conveyor or the like for detecting a speed thereof, a servo amplifier 11 for driving the servo motor 13, a motion control section 5 for transmitting a drive signal for driving the servo motor 13 to the servo amplifier 11, and a sequence control section 1 for transmitting a control signal to the motion control section 5 according to a prespecified sequence program.

The sequence control section 1 comprises a sequence program section 3 for storing therein a sequence program shown in FIG. 2, a control section 2 for generating a start signal or the like according to the sequence program stored in the sequence program section 3, and an interface section 4 for transmitting the start signal or the like generated in the control section 2 to the motion control section 5.

The motion control section 5 comprises an interface section 8 for receiving the start signal or the like transmitted from the sequence control section 1 (precisely, the interface section 4), a motion program section 9 for storing therein a motion program shown in FIG. 12, a control section 6 for generating a drive signal according to the start signal received in the interface section 8 as well as according to the motion program stored in the motion program section 9, an interface section 10 for transmitting the drive signal generated in the control section 6 to the servo amplifier 11, an interface section 24 for inputting a number of pulses according to the speed detected by the encoder 23, and a memory 7 for storing therein the number of pulses or the like received in the interface 24. The motion program in FIG. 12 is an example of the program set by a user using a peripheral equipment such as a keyboard or the like.

The servo amplifier 11 has an interface section 12 for receiving the drive signal transmitted from the motion control section 5 (precisely, the interface section 10), and drives the servo motor 13 according to the drive signal received in the interface section 12 as well as according to the position signal and speed signal detected in the encoder 14.

Operation of this positioning control unit is described below. In the sequence control section 1, the control section 2 reads out the sequence program shown in FIG. 2 from the sequence program section 3. The control section 2 determines whether an operating condition in the sequence program holds or not. When it is determined that the operating condition holds, the control section 2 generates a program-number signal indicating a number of the motion program ("No. 1" herein) to be executed as well as generates a start signal, and transmits these signals to the interface section 4. The interface section 4 receives the program-number signal and the start signal transmitted from the control section 2 and transmits these signals to the motion control section 5 (precisely, the interface section 8).

Figure 5:
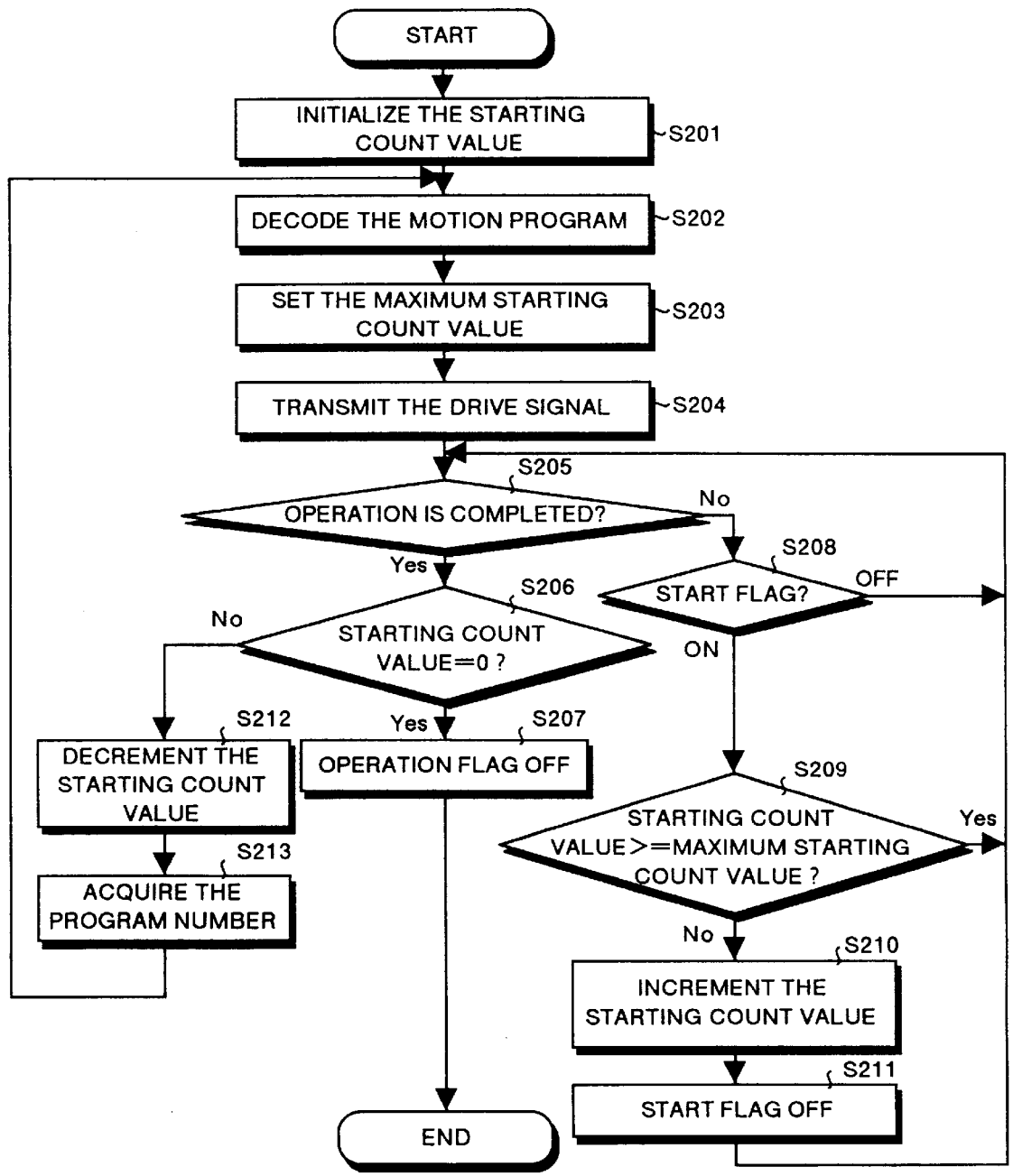
FIG. 5 is a flow chart showing an operation of the positioning control unit according to Embodiment 1.
Figure 13:
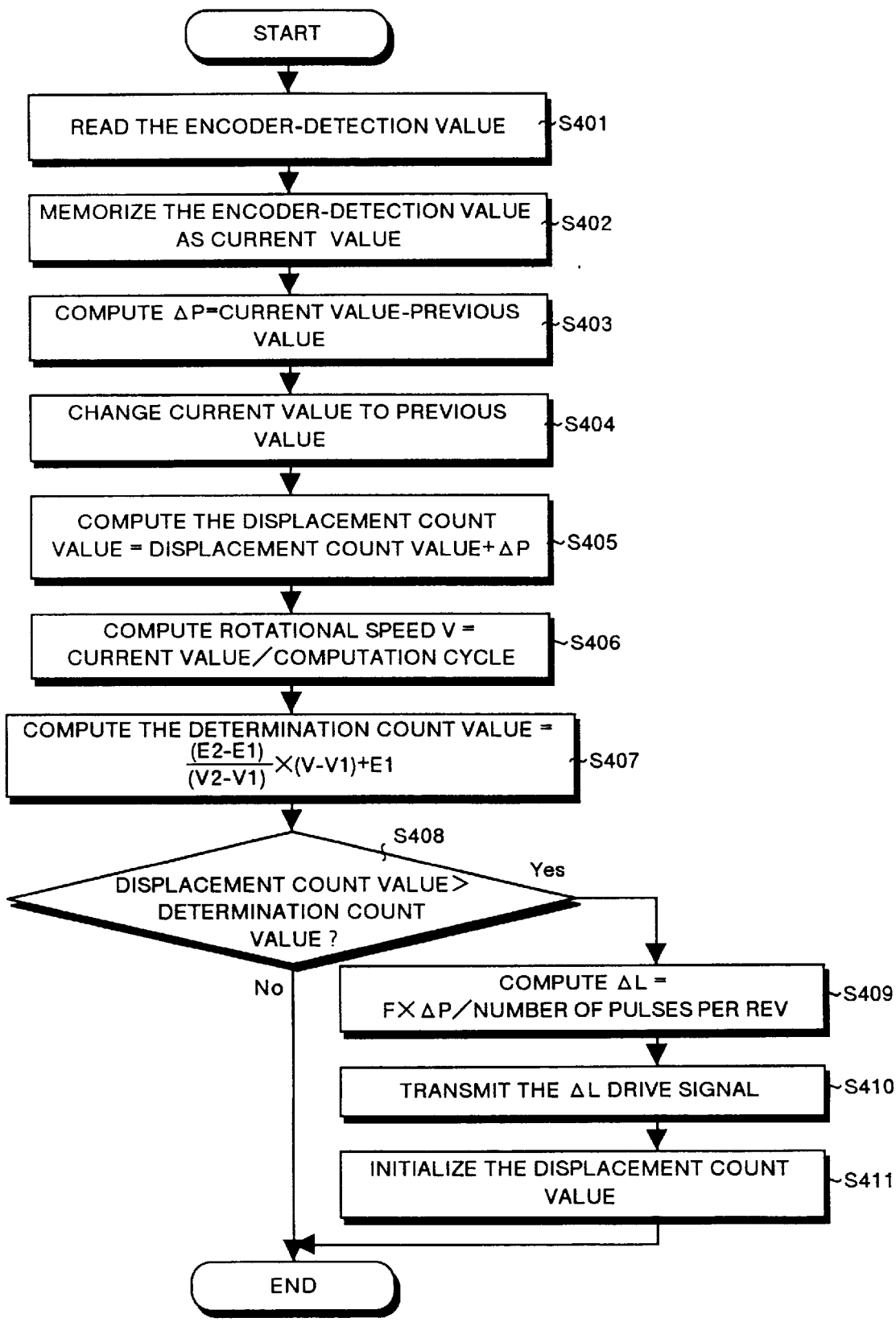
FIG. 13 is a flow chart showing an operation of the positioning control unit according to Embodiment 3.
Figure 15:
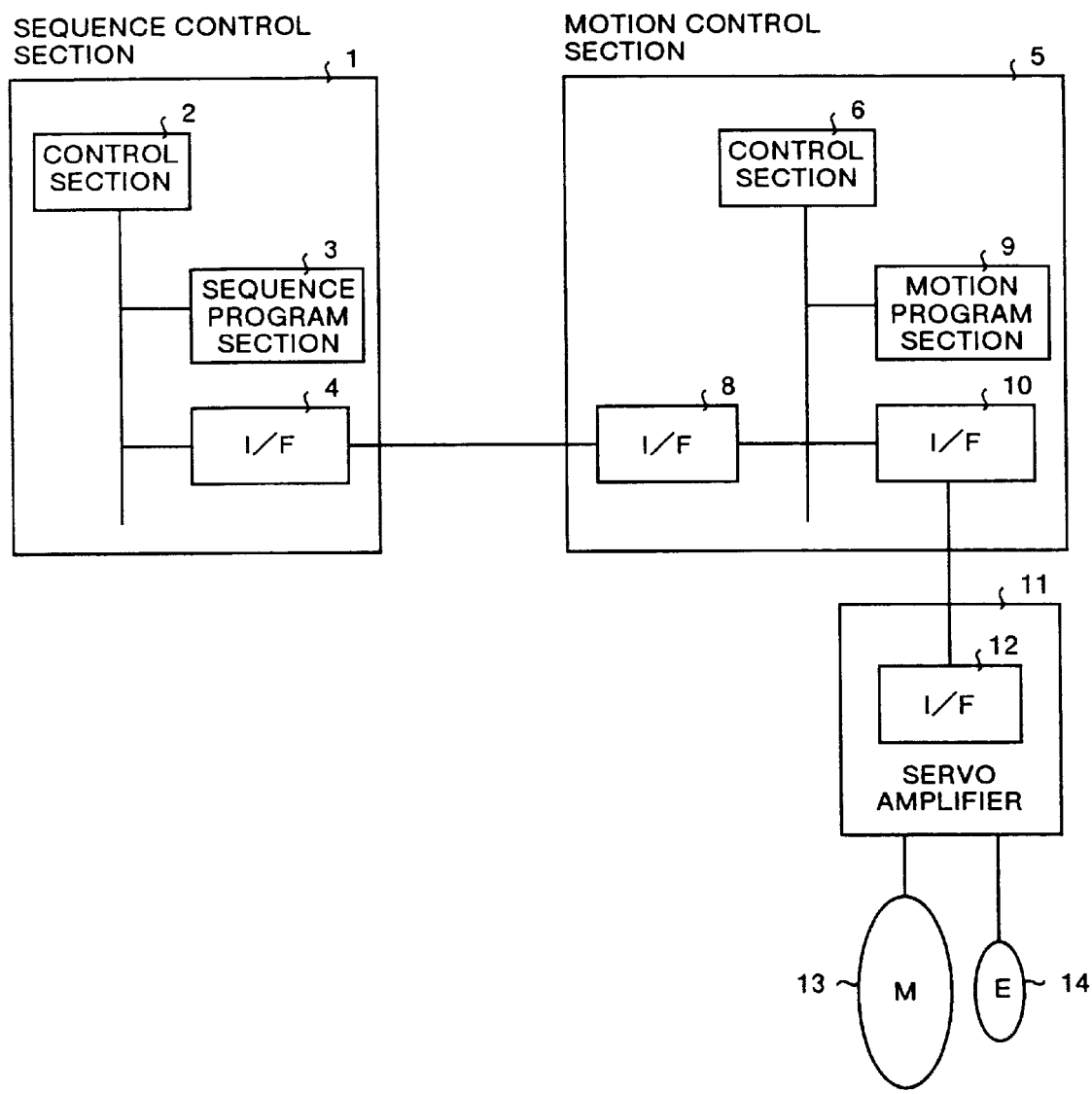
FIG. 15 is a block diagram showing general configuration of a positioning control unit based on a conventional technology.
Figures 16, 17:
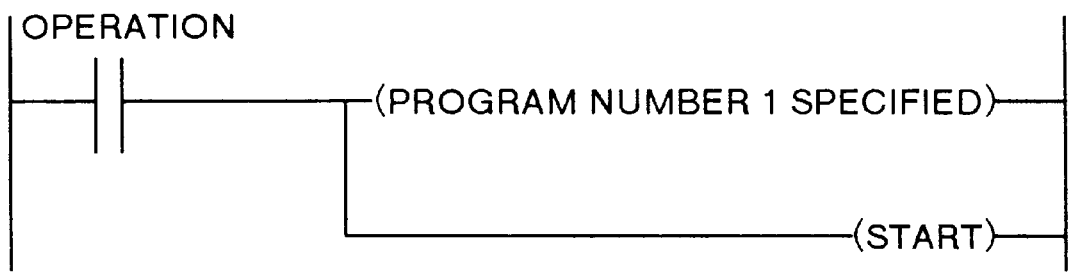
FIG. 16 shows an example of a sequence program in the positioning control unit based on the conventional technology.
FIG. 17 shows an example of a motion program in the positioning control unit based on the conventional technology.
Figure 18:
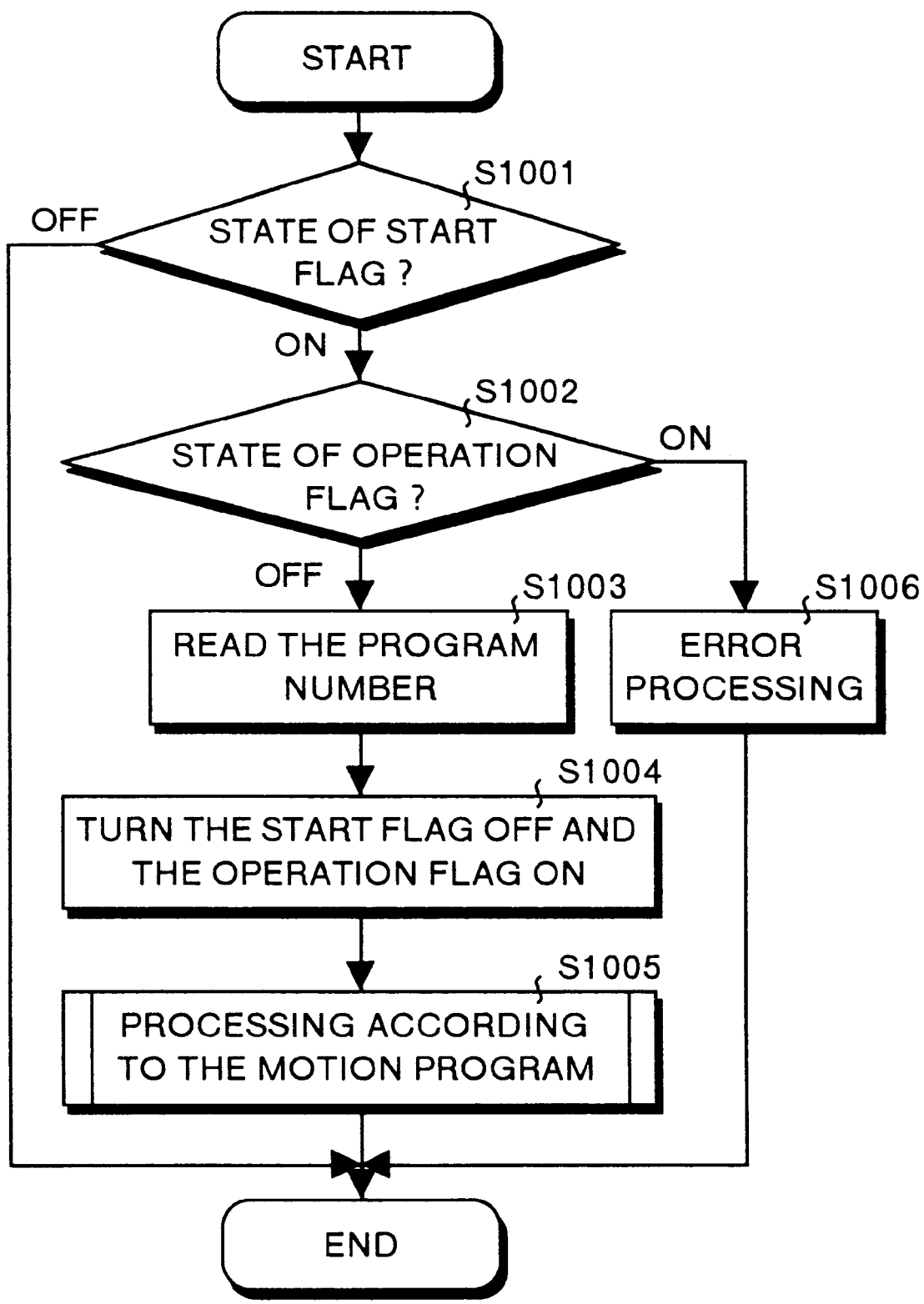
FIG. 18 is a flow chart showing an operation of the positioning control unit based on the conventional technology.
Figure 19:
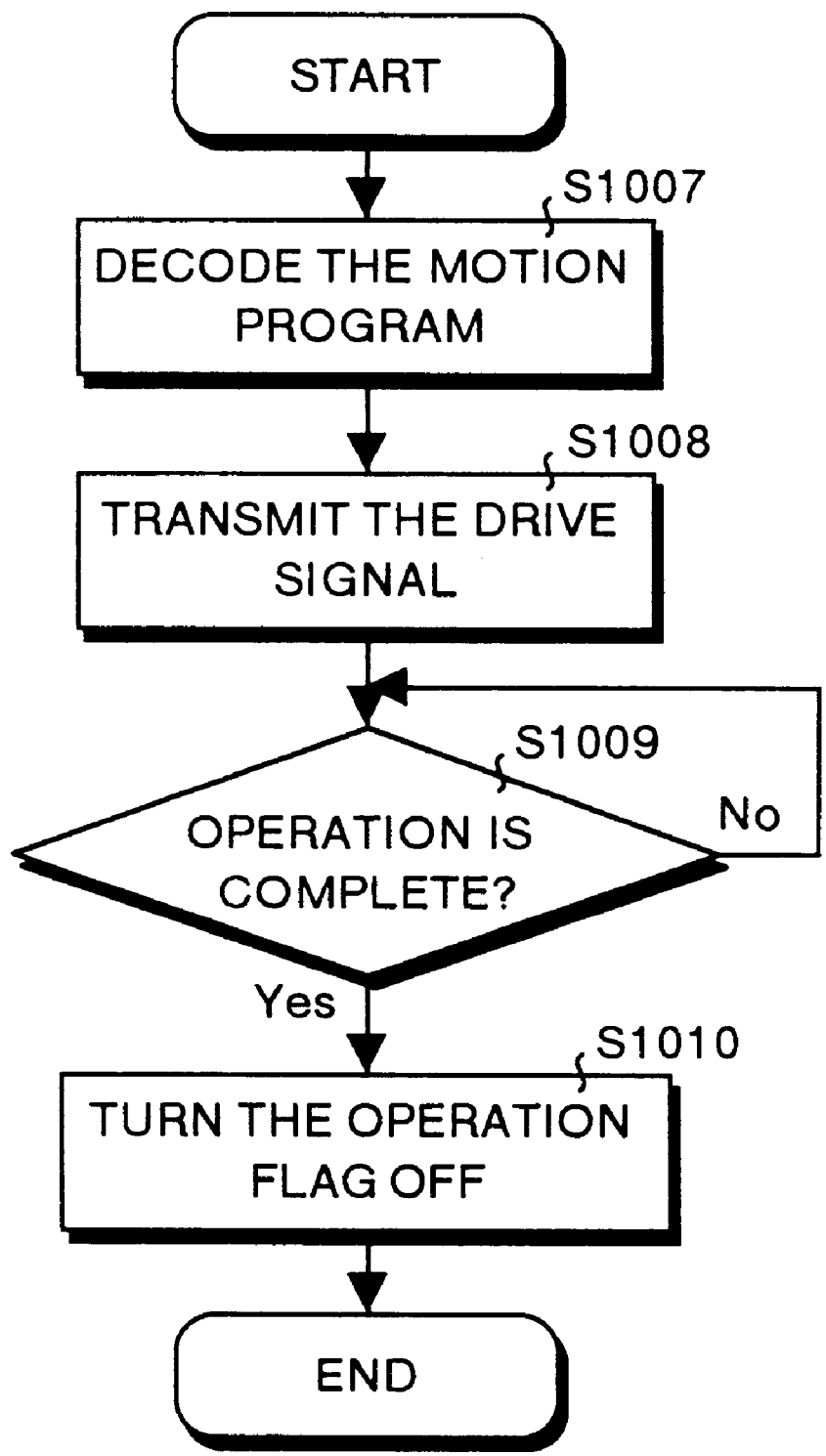
FIG. 19 is a flow chart showing an operation of the positioning control unit based on the conventional technology.
Figure 22:
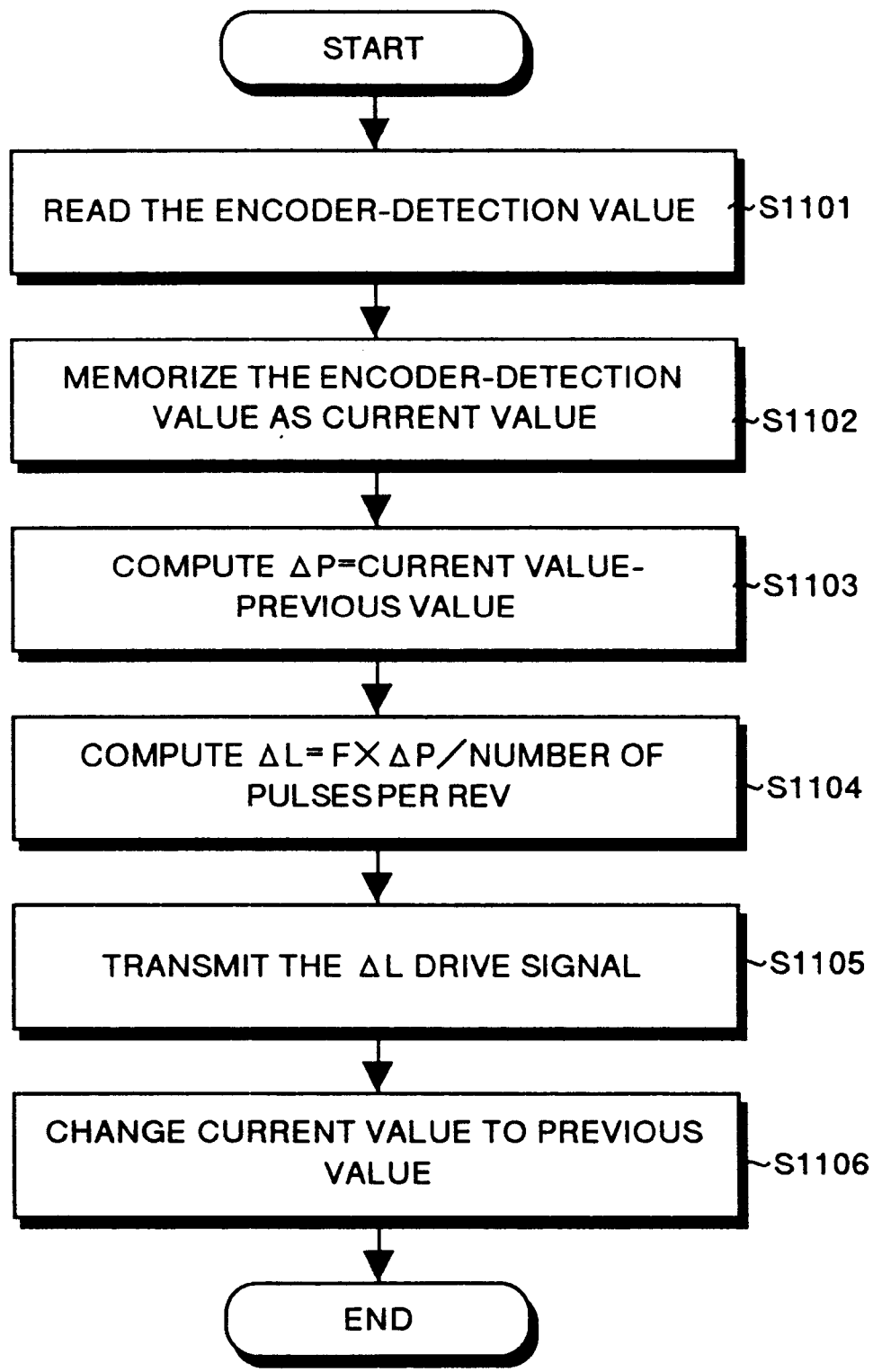
FIG. 22 is a flow chart showing an operation of the another example of the positioning control unit based on the conventional technology.

As an operation in the motion control section 5 is the same as the processing shown in the flow charts in FIG. 4 and FIG. 5, description of this part is omitted. A concrete processing according to the motion program shown in FIG. 12 is explained with reference to FIG. 13. It should be noted, in step S202 in FIG. 5, the control section 6 in the motion control section 5 decodes the motion program shown in FIG. 12 as described below.

| | |
|---|---|
| INC-1 | Positioning operation according to an instruction by POINT-TO-POINT increased value |
| Shaft 1, 1000. | Position at a position of 1000 mm in the + direction from the current position on the shaft 1 |
| Speed 100. | Feed speed = 100 mm/rev |
| V1 2000 | Determination speed pulse V1 = 2000 |
| E1 2000 | Optimal displacement pulse at V1 = 2000 |
| V2 300 | Determination speed pulse V2 = 300 |
| E2 6000 | Optimal displacement pulse at V2 = 6000 |

It should be noted that, the pulses V1, E1, V2 and E2 in the motion program shown in FIG. 12 are stored in the memory 7 as shown in FIG. 14. As described above, a determination count value (described later) to be computed by using these values is specified in the motion program, so that a determination count value can be set for each motion program, therefore, it is possible to achieve an optimal synchronous operation to an equipment as the object for control according to control contents indicated in the motion program.

The control section 6 transmits, according to the motion program shown in FIG. 12, a drive signal indicating positioning under the conditions that positioning is made at a position of 1000 mm in the+direction from the current position on the shaft 1 at the feed speed of 100 mm/rev especially to the servo amplifier 11 (precisely, the interface section 12) corresponding to the shaft 1. When the interface section 12 receives the drive signal, the servo amplifier 11 rotates the servo motor 13 up to the target position at the speed indicated by the received drive signal.

While this rotational operation is being executed, the control section 6 in the motion control section 5 reads the number of pulses in the encoder 23 for a prespecified period of time (described as encoder-detection value hereinafter) from the interface section 24 (step S401). This encoder-detection value indicates a rotational speed of a drive shaft for the conveyor (described a conveyor drive shaft) or the like. It should be noted that a time for measuring a number of pulses to detect this encoder-detection value (a certain period of time described above) is a sufficiently short period such as of the order of several milliseconds.

Then the control section 6 writes the read-in encoder-detection value in the memory 7 as shown in FIG. 14 (step S402). Namely, the current value indicates a latest encoder-detection value. Then, $\Delta P$ is computed by subtracting an encoder-detection value read at the previous time (previous value) from the current value according the expression described below (step S403).

$$\Delta P = \text{current value} - \text{previous value}$$

Herein, $\Delta P$ indicates a variation, namely a rate of acceleration between the detected two rotational speeds (in this case, the previous value and the current value) and is written in the memory 7 in the similar manner as the current value. After the processing in step S403, the value indicated by the current value is set as the previous value for the next processing (step S404).

Then, from a certain timing till present, a displacement count value indicating an accumulation value of a number of pulses corresponding to a value for acceleration or deceleration of the conveyor drive shaft is obtained (step S405) Namely, the displacement count value indicates an accumulated value of $\Delta P$ computed in step S403, and it is computed by adding $\Delta P$ to the previous displacement count value.

The current rotational speed V of the conveyor drive shaft is computed (step S406) according to the expression described below, by dividing the current value set in step S402 by a specified period of time (measuring time) for measuring a number of pulses in step S401.

$$V = \text{current value} / \text{computation cycle}$$

A determination count value is computed as according to the expression described below by using the rotational speed V computed instep S406 and V1, E1, V2 and E2 stored in the memory 7.

$$\text{Determination count value} = (V-V1) \times (E2-E1)/(V2-V1) + E1$$

Herein, the determination count value is a value specified for each current rotational speed V for the conveyor drive shaft, and a timing of transmitting a drive signal indicating increase or decrease of the feed speed to the servo motor 13 by depending on this determination count value is decided.

It is determined whether the displacement count value computed in step S405 is larger than the determination count value computed in step S407 or not (step S408). When it is determined in step S408 that the displacement count value is not larger than the determination count value, the control section 6 does not transmit a drive signal for a synchronous operation to the servo motor 13, and ends the processing in this flow chart.

When it is determined in step S408 that the displacement count value is larger than the determination count value, $\Delta L$ is computed according to the expression described below by using ΔP computed in step S403, number of pulses for 1 rev as a prespecified reference (written in the memory 7) and feed speed F (herein, 100 mm/rev) set in the motion program.

$$\Delta L = \times \Delta P / \text{number of pulses for 1 rev}$$

Herein, ΔP/number of pulses for 1 rev indicates increase or decrease of a number of rotation of a conveyor drive shaft per specified period of time, and by multiplying this value by the feed speed F set in the servo motor 13, a rotational speed increase or decrease rate ΔL for following the rotational speed of the conveyor drive shaft detected in the encoder 23 can be obtained.

The control section 6 transmits a signal indicated by ΔL computed in step S409 to the interface section 10 as a servo-amplifier instruction value. The interface section 10 transmits the received ΔL signal to the servo amplifier 11 (precisely, the interface section 12) (step S410), the servo amplifier 11 drives the servo motor 13 at the feed speed increased or decreased according to this ΔL signal. Accordingly, it is possible to achieve the rotational drive of the servo motor 13 in synchronism to operational speed of a different driving system such as a conveyor drive shaft.

After the processing in step S410, in order to determine the transmission of the next drive signal (the processing corresponding to step S408), the displacement count value is initialized (step S411), and the processing in this flow chart is ended.

As described above, with the positioning control unit according to Embodiment 3, in the operation of a servo motor according to the motion program to be executed as soon as an operational condition indicated in the sequence program holds, a determination count value according to speed of a drive shaft of a conveyor or the like is decided, and this determination count value is compared to an increase/decrease accumulated value of pulses corresponding to a rotational speed of the drive shaft of the conveyor. Thus, it is possible to achieve a synchronous operation to the servo motor by changing the feed speed of the servo motor according to a servo motor instruction value computed from the rotational speed of the drive shaft of the conveyor at that time.

Especially, the positioning control unit according to Embodiment 3 issues a speed instruction to a servo motor depending on the displacement count value corresponding to a displacement rate of the conveyor drive shaft. Thus, it is possible to prevent variations in synchronous displacement occurring due to changes in rotational speed of a conveyor drive shaft such that a speed following operation of the servo motor is performed at shorter cycle, for example, when the rotational speed of the conveyor drive shaft abruptly increases.

As described above, with the present invention, the sequence control section outputs start signals for a motion program specified within a sequence program to be executed to a motion control section, and the motion control section can continuously receive the start signals and execute the motion program specified thereby. Thus, the sequence control section can output a start signal for the next motion program without checking whether the operation of motion program is completed or not, and continuous execution of the motion program can efficiently and speedily be performed. Therefore, the equipment as an object for control can smoothly be operated through a servo amplifier.

With another aspect of the present invention, the motion control section can receive start signals for a next motion program even when the motion program is in operation, and continuously execute the motion program indicated by the start signal received next after the operation of the motion program is completed without intermission. Thus, a continuous execution of the motion program can efficiently and speedily be performed. Therefore, the equipment as an object for control can smoothly be operated through a servo amplifier.

With another aspect of the present invention, a motion control section comprises a start signal storage section for storing therein a plurality of signals for motion programs continuously received. Thus, a plurality of motion programs can continuously be executed without intermission, and continuous execution of the plurality of motion programs can efficiently and speedily be performed. Therefore, the complicated operations of the equipment as an object for control can smoothly be controlled through a servo amplifier.

With another aspect of the present invention, a motion control section can read out, from a start signal storage section for storing therein a plurality of start signals for motion programs continuously received, a motion program to be executed next and execute the motion program after the operation of a motion program is completed. Thus, the motion programs can accurately and speedily be execute in order of being outputted from a sequence control section. Therefore, the complicated operations of the equipment as an object for control can smoothly be controlled through a servo amplifier.

With another aspect of the present invention, a motion control section stores therein a number of counts of start signals for continuously received motion programs each as a count value, adds the count value when a start signal for a motion program is received, and subtracts the count value when the operation of the motion program is completed. Thus, a number of motion programs to be executed next can be managed, furthermore, existence of a motion program to be continuously executed next can be confirmed by referring to the count values.

With another aspect of the present invention, a motion control section stores therein a number of continuously operable motion programs as a maximum count value, and does not add a count value when the count value exceeds the maximum count value. Thus, it is possible to prevent a continuous operation of a large number of motion programs requiring a long time, furthermore, prevent the wasteful use of storage capacity for storing start signals for motion programs or the like.

With another aspect of the present invention, a maximum count value is indicated in a motion program. Thus, a maximum count value can be set for each motion program, and optimal motion programs according to control contents indicated by the motion programs can continuously be operated.

With another aspect of the present invention, a sequence control section outputs the start signals for a motion program specified within a sequence program to be executed to a motion control section, and the motion control section receives the start signal and not only executes the specified motion program but also can restart an operation according to the motion program also by receiving a restart signal having been inputted in a signal input section. Thus, a motion program can easily be restarted without requiring preparation of a plurality of motion programs each having the same contents.

With another aspect of the present invention, a motion control section can determine whether a motion program immediately after its completion is to be restarted or not by checking the restart signal information stored in a data storage section. Therefore, a motion program can accurately be restarted.

With another aspect of the present invention, a motion control section can receive, even when a motion program is in operation, a restart signal and a change restart signal information to on an ON state. Therefore, a continuous and efficient restarting operation of motion programs can be executed before the operation of a motion program is completed.

With another aspect of the present invention, a motion control section can receive, after the operation of a motion program is completed, a restart signal and a change restart signal information on an ON state. Therefore, a restarting operation of a motion program can be executed at a desired timing.

With another aspect of the present invention, a sequence control section outputs a start signal for a motion program specified within a sequence program to be executed to a motion control section, and the motion control section can receive the start signal and execute the specified motion program, and the motion control section also outputs, for the purpose of synchronizing equipment as an object for control to equipment as an object for synchronization, a drive instruction according to driving speed to a servo amplifier at a timing based on the driving speed of the equipment as an object for synchronization detected by a speed detecting section. Thus, it is possible to resolve variations in positions of equipment as an object for synchronization occurring at the time of starting a synchronous operation according to changes in the driving speed of the equipment as an object for synchronization. Therefore, synchronous operation to the equipment as an object for control can accurately be achieved.

With another aspect of the present invention, a motion control section determines a timing of outputting a drive instruction as a case where a count value counted by accumulating a rate of acceleration or declaration of a equipment as an object for synchronization from driving speed detected in a speed detecting section exceeds a determination count value stored in a data storage section. Therefore, a synchronous operation to the equipment as an object for control can more accurately be achieved by resolving variations in positions of equipment as an object for synchronization occurring at the time of starting a synchronous operation according to changes in the driving speed of the equipment as an object for synchronization.

With another aspect of the present invention, a determination count value is indicated in the motion program. Thus, a determination count value can be set for each motion program. Therefore, it is possible to achieve an optimal synchronous operation to the equipment as an object for control according to control contents indicated in the motion program.

With another aspect of the present invention, a motion control section outputs a speed increase/decrease signal, as a drive instruction, computed by using a rate of acceleration or declaration of the equipment as an object for synchronization computed from driving speed detected in a speed detecting section and speed shown in a positioning instruction. Therefore, the equipment as an object for control can accurately be synchronized and operated to the equipment as an object for synchronization at the speed according to the rate of acceleration or declaration thereof.

This application is based on Japanese patent application No. HEI 10-280113 filed in the Japanese Patent Office on Oct. 1, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A positioning control unit for controlling the position of positioning equipment at a target position comprising:

a sequence control section for storing therein a sequence program for starting a motion program used for positioning said equipment at the target position and outputting a start signal for starting a motion program specified in the sequence program;

a motion control section, having a motion program section for storing therein the motion program and a data storage section for storing therein data used by the motion control section, for continuously receiving start signals from said sequence control section and outputting a positioning instruction according to the motion program indicated by the start signals; and a servo amplifier for providing control over said equipment according to the positioning instruction;

wherein the motion control section receives the start signals while the motion program is in operation.

2. A positioning control unit for controlling the position of positioning equipment at a target position comprising:

a sequence control section for storing therein a sequence program for starting a motion program used for positioning said equipment at the target position and outputting a start signal for starting a motion program specified in the sequence program;

a motion control section, having a motion program section for storing therein the motion program and a data storage section for storing therein data used by the motion control section, for continuously receiving start signals from said sequence control section and outputting a positioning instruction according to the motion program indicated by the start signals; and a servo amplifier for providing control over said equipment according to the positioning instruction;

wherein the motion control section further comprises a start signal storage section for storing therein a plurality of received start signals.

3. A positioning control unit according to claim 1; wherein the motion control section further comprises a start signal storage section for storing therein a plurality of received start signals.

4. A positioning control unit according to claim 2; wherein the motion control section reads the start signals in the order they were stored in the start signal storage section and outputs the positioning instruction according to the motion program.

5. A positioning control unit for controlling the position of positioning equipment at a target position comprising:

a sequence control section for storing therein a sequence program for starting a motion program used for positioning said equipment at the target position and outputting a start signal for starting a motion program specified in the sequence program;

a motion control section, having a motion program section for storing therein the motion program and a data storage section for storing therein data used by the motion control section, for continuously receiving start signals from said sequence control section and outputting a positioning instruction according to the motion program indicated by the start signals; and a servo amplifier for providing control over said equipment according to the positioning instruction;

wherein the motion control section stores therein a count value to be added each time when the start signal is received as data for the data storage section, subtracts the count value when the operation of the motion program is completed, and executes the next motion program.

6. A positioning control unit according to claim 5; wherein the motion control section stores therein a maximum count value indicating a maximum possible value in the count value as data for the data storage section, and does not add the count value when the count value exceeds the maximum count value.

7. A positioning control unit according to claim 6; wherein the maximum count value is set in a motion program.

8. A positioning control unit for controlling the position of positioning equipment at a target position comprising:

a sequence control section for storing therein a sequence program for starting a motion program used for positioning said equipment at the target position and outputting a start signal for starting a motion program specified in the sequence program;

a signal input section for inputting a restart signal for restarting an operation according to the motion program;

a motion control section, having a motion program section for storing therein the motion program and a data storage section for storing therein data used by the motion control section, for continuously receiving the start signal or restart signal and outputting a positioning instruction according to the motion program indicated by the start signal; and a servo amplifier for providing control over said equipment according to the positioning instruction.

9. A positioning control unit according to claim 8; wherein the motion control section stores therein, when receiving the restart signal, restart signal information indicating its ON state as data for the data storage section, and restarts the latest completed motion program when the operation of the motion program is completed and the restart signal information indicates an ON state.

10. A positioning control unit according to claim 9; wherein the motion control section changes, when receiving the restart signal with the motion program in operation, the restart signal information to the ON state.

11. A positioning control unit according to claim 9; wherein the motion control section changes the restart signal information to an ON state when it receives the restart signal after the operation of the motion program is completed.

12. A positioning control unit for controlling the position of positioning equipment at a target position comprising:

a speed detector for detecting a driving speed of equipment to be synchronized for synchronizing with said positioning equipment to be controlled;

a sequence control section for storing therein a sequence program for starting a motion program used for positioning said positioning equipment at the target position and outputting a start signal for starting a motion program specified in the sequence program;

a motion control section, having a motion program section for storing therein the motion program and a data storage section for storing therein data used by the motion control section, for continuously receiving the start signal and outputting a positioning instruction according to the motion program indicated by the start signal and outputting a driving instruction according to the driving speed at a timing based on the driving speed detected in the speed detecting section; and a servo amplifier for providing control over said positioning equipment to be controlled according to the positioning instruction, as well as the driving instruction.

13. A positioning control unit according to claim 12; wherein the motion control section stores therein a determination count value for determining a timing of outputting the driving instruction as data for the data storage section, computes a rate of acceleration or declaration of the equipment to be synchronized from the driving speed detected in the speed detecting section, further computes a count value obtained by accumulating the rate of acceleration or declaration, and outputs the driving instruction when the count value exceeds the determination count value.

14. A positioning control unit according to claim 13; wherein the determination count value is set in the motion program.

15. A positioning control unit according to claim 12; wherein the motion control section outputs a speed increase/decrease signal generated by using the rate of acceleration or declaration of the equipment to be synchronized computed from the driving speed detected in the speed detecting section and the speed shown in the positioning instruction.

* * * * *